United States Patent
Ewert

(10) Patent No.: US 10,882,418 B2
(45) Date of Patent: Jan. 5, 2021

(54) METHOD FOR CLASSIFYING AN OCCUPANT AND PROVIDING THE OCCUPANT CLASSIFICATION FOR A SAFETY DEVICE IN A MOTOR VEHICLE

(71) Applicant: Robert Bosch GmbH, Stuttgart (DE)

(72) Inventor: Marlon Ramon Ewert, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 217 days.

(21) Appl. No.: 15/687,009

(22) Filed: Aug. 25, 2017

(65) Prior Publication Data
US 2018/0065505 A1 Mar. 8, 2018

(30) Foreign Application Priority Data
Sep. 2, 2016 (DE) .......................... 10 2016 216 648

(51) Int. Cl.
*B60N 2/00* (2006.01)
*B60R 21/015* (2006.01)
*B60R 21/16* (2006.01)
*B60R 21/02* (2006.01)

(52) U.S. Cl.
CPC ........ *B60N 2/002* (2013.01); *B60R 21/01512* (2014.10); *B60R 21/16* (2013.01); *B60R 2021/0273* (2013.01)

(58) Field of Classification Search
CPC . B60N 2/002; B60R 16/037; B60R 21/01512; B60R 21/16; B60R 2021/0273; B60R 21/0153; B60R 21/01538
See application file for complete search history.

(56) References Cited

U.S. PATENT DOCUMENTS

| | | | | | |
|---|---|---|---|---|---|
| 7,147,246 | B2* | 12/2006 | Breed | .................. | B60R 21/0152 280/735 |
| 7,164,117 | B2* | 1/2007 | Breed | ............... | B60R 21/01516 250/208.1 |
| 7,243,945 | B2* | 7/2007 | Breed | .................... | B60N 2/002 280/735 |
| 7,415,126 | B2* | 8/2008 | Breed | ...................... | B60J 10/00 382/100 |
| 7,475,903 | B2* | 1/2009 | Watts | ................ | B60R 21/01516 280/735 |
| 7,570,785 | B2* | 8/2009 | Breed | ................ | G06K 9/00228 382/100 |
| 7,663,502 | B2* | 2/2010 | Breed | .................... | G01S 17/04 340/12.25 |

(Continued)

FOREIGN PATENT DOCUMENTS

| | | |
|---|---|---|
| DE | 102006021380 A1 | 11/2007 |
| DE | 102007015877 A1 | 10/2008 |

*Primary Examiner* — Frederick M Brushaber
(74) *Attorney, Agent, or Firm* — Norton Rose Fulbright US LLP; Gerard Messina

(57) ABSTRACT

A method for classifying an occupant and providing the occupant classification for a safety device in a motor vehicle. The method includes reading in a first piece of information that indirectly describes the occupant; reading in a second piece of information that directly describes the occupant; classifying the occupant, taking the indirect and direct information into account; and providing the occupant classification to an interface to the safety device for the vehicle. A corresponding device is also described.

11 Claims, 2 Drawing Sheets

(56) References Cited

U.S. PATENT DOCUMENTS

| | | | | |
|---|---|---|---|---|
| 7,766,383 B2* | 8/2010 | Breed | ............... | B60R 21/01534 |
| | | | | 280/735 |
| 9,511,683 B2* | 12/2016 | Sala | ..................... | B60N 2/0244 |
| 2006/0208169 A1* | 9/2006 | Breed | ............... | G06K 9/00624 |
| | | | | 250/221 |
| 2006/0226641 A1* | 10/2006 | Watts | ............... | B60R 21/01516 |
| | | | | 280/735 |
| 2007/0086624 A1* | 4/2007 | Breed | ............... | G06K 9/00832 |
| | | | | 382/104 |
| 2007/0132220 A1* | 6/2007 | Breed | ................ | B60R 21/0152 |
| | | | | 280/735 |
| 2007/0154063 A1* | 7/2007 | Breed | ............... | B60R 21/01538 |
| | | | | 382/100 |
| 2008/0142713 A1* | 6/2008 | Breed | ............... | B60R 21/01516 |
| | | | | 250/330 |
| 2008/0144944 A1* | 6/2008 | Breed | ............... | G06K 9/00832 |
| | | | | 382/224 |
| 2008/0294315 A1* | 11/2008 | Breed | ................... | E05F 15/431 |
| | | | | 701/49 |
| 2012/0053793 A1* | 3/2012 | Sala | ....................... | B60N 2/002 |
| | | | | 701/45 |

\* cited by examiner

METHOD FOR CLASSIFYING AN OCCUPANT AND PROVIDING THE OCCUPANT CLASSIFICATION FOR A SAFETY DEVICE IN A MOTOR VEHICLE

CROSS REFERENCE

The present application claims the benefit under 35 U.S.C. § 119 of German Patent Application No. DE 102016216648.4 filed on Sep. 2, 2016, which is expressly incorporated herein by reference in its entirety.

FIELD

The present invention relates to a method for classifying an occupant and providing the occupant classification for a safety device in a motor vehicle, including the following steps:
reading in a first piece of information that indirectly describes the occupant;
reading in a second piece of information that directly describes the occupant;
classifying the occupant, taking the indirect and direct information into account;
providing the occupant classification to an interface to the safety device for the vehicle.
Moreover, the present invention relates to a corresponding device.

BACKGROUND INFORMATION

At the present time, vehicle occupant recognition generally takes place using sensors that are installed in the vehicle seats. These sensors are designed for carrying out occupant recognition with the aid of mass estimation. In addition, via so-called seat belt buckles it is recognized whether or not a vehicle occupant is wearing his/her seat belt while traveling.

The aim of occupant recognition in the vehicle is the more targeted or selective triggering of restraint systems (airbags) in the event of a collision, so that the vehicle occupants are optimally protected during the collision. For example, passenger airbags must not be triggered when a small child is present in a seat shell on the front passenger seat of the vehicle. However, this requires reliable recognition of the small child on the front passenger seat.

German Patent Application No. DE 10 2006 021 380 A1 describes a vehicle occupant safety system. A vehicle occupant safety system includes at least one restraint device having at least one settable parameter, a vehicle seat that includes at least one seat sensor which detects the sitting position of a vehicle occupant, and a seat belt device that includes at least one belt extraction sensor that detects a belt extension length. A controller is provided which, based on the values of the seat sensor and the belt extraction sensor, determines whether the vehicle occupant is in a forward-leaning position, the controller fixing the value of the settable parameter of the restraint device as a function of a forward-leaning position of the vehicle occupant.

German Patent Application No. DE 10 2007 015 877 A1 describes an imaging device for a virtual image in a vehicle, positioning of the virtual image being settable. The device includes an interface to a detection unit for detecting a spatial adjustment of least one vehicle part, and a processing unit for positioning the virtual image as a function of the spatial adjustment of the at least one vehicle part.

An autonomous vehicle is a vehicle that manages without a driver. The vehicle travels autonomously by independently recognizing, for example, the course of the roadway, other road users, or obstacles, and computes the appropriate control commands in the vehicle and relays them to the actuators in the vehicle, as the result of which the driving pattern of the vehicle is correctly influenced. In a fully autonomous vehicle, the driver does not take part in the driving process.

Presently available vehicles are not yet able to operate autonomously. On the one hand, this is due to the fact that the corresponding technology is not fully technically mature. On the other hand, it is still presently stipulated by law that the vehicle driver him/herself must be able to intervene in the driving process at all times. This hampers the implementation of autonomous vehicles. However, systems from various manufacturers already exist that represent autonomous or semiautonomous driving. These systems are in a phase of intensive testing. It is expected that fully autonomous vehicle systems will be commercially available in a few years, as soon as the above-mentioned hurdles have been eliminated.

In present vehicles, the occupants of the vehicle usually sit facing in the travel direction. This is true in particular for the occupants situated in the front of a vehicle, since, for example, the driver has to steer the vehicle and therefore must be looking at the roadway at all times. In an autonomous or semiautonomous vehicle, this is no longer absolutely necessary, since the vehicle is autonomously or semi-autonomously controlled, and in a sense there is no longer a vehicle driver. The vehicle occupants may therefore change their positions during travel, for example, as soon as the vehicle is underway in the autonomous mode, for example. Specifically, this means that the vehicle occupants, who initially are sitting facing in the travel direction, turn their seats in the direction opposite the travel direction, for example to talk more easily with the vehicle occupants in the rear vehicle area. In the future, camera-, laser-, or radar-based methods are to be used within the vehicle for the purpose of interior sensing. In the process, the number, position, and location of the vehicle occupants in a vehicle are detected. These methods are used as a substitute for the conventional estimation of the mass of occupants in the vehicle with the aid of sensors installed in the seats, with the aim of making more simple applications of the system possible for various vehicle variants.

However, the mentioned sensing methods have various disadvantages which are to be eliminated within the scope of the present invention. For example, camera-based methods use infrared emitters in order to reliably recognize the vehicle occupants at night as well. However, if the temperature of a vehicle occupant is the same as the temperature of the vehicle interior, recognition of the vehicle occupant is not reliably achievable. Radar sensors have the significant disadvantage that the radar beams within the vehicle are reflected by the various vehicle structures. The recognition of vehicle occupants is thus made more difficult. Laser sensors have the disadvantage of having a relatively low resolution, and their measurements are thus inaccurate primarily at short distances.

SUMMARY

An example method according to the present invention may advantageously allow occupants in the vehicle to be recognized even more reliably and accurately. The safety devices in the vehicle are thus activated in an even more targeted manner. Safety in road traffic is thus increased. This is made possible according to the present invention by the features described herein. Refinements of the present invention are described herein.

The example method according to the present invention for classifying an occupant and providing the occupant classification for a safety device in a motor vehicle includes:
  reading in a first piece of information that indirectly describes the occupant;
  reading in a second piece of information that directly describes the occupant;
  classifying the occupant, taking the indirect and direct information into account;
  providing the occupant classification to an interface to the safety device for the vehicle.

This is understood to mean that the method allows occupant recognition and occupant classification. The precise occupant position and occupant orientation are hereby ascertained in the vehicle. Likewise, a characterization of the vehicle occupant may take place based on bodily features such as size, weight, etc. In this sense, the method may also be regarded as a method for interior sensing in a motor vehicle. Following the data ascertainment, the ascertained data or already processed pieces of information are provided in order to appropriately set or adjust a safety device. A restraint system, an airbag, etc., are understood, for example, as a safety device. The transmission takes place with the aid of a cable interface and/or wireless interface. Based on the classification of the occupant, an appropriate signal, for example, is generated which may be relayed and/or further processed for setting and/or controlling further vehicle functions or vehicle devices.

The term "first piece of information that indirectly describes the occupant" is understood to mean the following: Indirect pieces of information are pieces of information that are not directly collectable by measuring the occupant or evaluating direct pieces of information, for example by recording the occupant. However, indirect pieces of information allow an indirect estimation of a piece of information regarding the occupant. It is also advantageous that a plurality of information sources is available for this purpose. Likewise, indirect pieces of information are often already present since they have been collected within the scope of other measurements. A separate ascertainment is therefore not necessary. Likewise, an evaluation of the indirect pieces of information is often possible within a very short period of time. However, due to the lack of a direct reference, these estimations are associated with a high error rate, or at least the risk of errors.

The term "second piece of information that directly describes the occupant" is understood to mean the following: Direct pieces of information in relation to the occupant are understood to mean pieces of information that are collected directly from the occupant, for example by recording and evaluating the recording of the occupant, or with the aid of direct measuring data of the body of the occupant. However, the ascertainment of direct pieces of information must often be coordinated with the particular application. The ascertainment and the associated evaluation may also take a certain amount of time. A large amount of time is required in particular when numerous uncertainties are present in the system. However, the ascertainment of direct pieces of information, in particular as a function of the sensors used, is also not free of error. For example, camera-based methods use infrared emitters in order to reliably recognize the vehicle occupants at night as well. However, if the temperature of a vehicle occupant is the same as the temperature of the vehicle interior, recognition of the vehicle occupant is not reliably achievable.

A combination of both pieces of information now advantageously takes place. The quality of the results is thus significantly improved. The occupant recognition as well as the classification are therefore even more accurate and even more reliable. Based on the improved results, this results in optimized control and adjustment of the mentioned safety devices, for example restraint systems, airbags, etc., due, for example, to even more targeted triggering of airbags. This results in increased safety in road traffic.

In addition, in autonomous or semiautonomous vehicles it is possible, immediately prior to a vehicle collision, to shift the instantaneous position and location of the occupants (adaptive seats) in an anticipatory manner, for example to minimize injuries to the occupant. The precise knowledge of the location and position of the occupants at each point in time during travel is needed for this purpose. Due to the fact that recognition and locating of the vehicle occupants takes place with the aid of the sitting positions and/or orientations, the interior sensors may have a much more streamlined and favorable design. The exposure to radiation in the vehicle is thus reduced to a minimum.

In one advantageous embodiment, the method includes a rough classification of the occupant taking place based on the ascertained first piece of information, and/or a fine classification of the occupant takes place based on the ascertained second piece of information.

This is understood to mean that in a rough classification (or rough positioning) the approximate classification (or position) of the occupant is estimated. A fine classification (or fine positioning) ascertains the detailed or precise classification (or position) of the occupant. The two approaches may also involve only estimates, depending on the accuracy of the method. For example, a rough classification initially takes place, followed by a fine classification.

An adaptation of the classification quality to the confidence level of the particular ascertained pieces of information (first piece of information, second piece of information) is thus advantageously made possible. The validity of the classification results may thus be increased.

In one possible embodiment, the method includes that the first piece of information includes data concerning a vehicle seat and/or a steering wheel and/or a side mirror and/or a rearview mirror.

This is understood to mean that the described first piece of information (i.e., the indirect information concerning an occupant) is, or at least contains, a piece of information concerning the seat in the vehicle that is adjusted to the particular occupant. The sitting position and orientation data are incorporated into the occupant classification as follows: (A) The sitting position provides information about the size of an occupant (leg length). This information may be directly taken into account in the occupant recognition. (B) The sitting position provides information about whether or not someone is present on the seat. For example, the seats in the vehicle could be folded down when they are not being used, and no occupant classification is then carried out on these seats. (C) The sitting position and/or orientation provide(s) information about how an occupant is sitting relative to other reference points, for example relative to the interior sensors. This information simplifies the recognition in the interior sensor or in the occupant classification control unit.

The analysis of the vehicle seat advantageously allows wide-ranging conclusions to be drawn concerning its use and its user. It is thus possible, for example, to deduce information concerning the position and orientation of the occupant and also concerning the occupant's size.

In one preferred embodiment, the method includes that the first piece of information is ascertained with the aid of a sensor on a vehicle seat and/or steering wheel and/or side mirror and/or rearview mirror.

This is understood to mean that for ascertaining the first piece of information, a sensor is integrated, for example, onto the seat, into the seat, onto or into the seat rail, or into the drive system of the seat. In addition, the appropriate information (for example, energization of the drive motor of the seat adjustment system) may also be ascertained by evaluating the actuators of the particular component. Any setting, position, or rotation of the seat may be ascertained.

Simple data ascertainment is thus advantageously made possible. The described information is sometimes already available in the control unit for the seat controller. In this case, it would not even be necessary to use additional sensors or methods to collect this information.

In one alternative refinement, the method includes that the first piece of information includes data concerning:
  a setting of a vehicle seat; and/or
  a position of a vehicle seat; and/or
  a displacement of a vehicle seat; and/or
  an orientation of a vehicle seat; and/or
  a rotatory adjustment of a vehicle seat; and/or
  a setting of a steering wheel, and/or of a side mirror and/or rearview mirror; and/or
  a position of a steering wheel; and/or
  a displacement of a steering wheel; and/or
  an orientation of a side mirror and/or rearview mirror; and/or
  a rotatory adjustment of a side mirror and/or rearview mirror.

This is understood to mean that the described first piece of information (i.e., the indirect information concerning an occupant) is, or at least contains, one of the mentioned detailed pieces of information concerning the seat in the vehicle that is adjusted to the particular occupant. Pieces of information concerning the driver may also be deduced with the aid of so-called negative pieces of information concerning the seat; for example, a seat that is not adjusted or is folded up is thus an indicator that no occupant is present there. In one alternative embodiment, indirect pieces of information concerning the driver and the position of the driver may also be ascertained with the aid of the setting of the following components: steering wheel, side mirror, rearview mirror.

Based on the particular information, it is advantageously possible to draw detailed conclusions concerning the particular user of the vehicle seat. Taking into account multiple features increases the quality of the conclusions. In addition, further conclusions concerning the characterization of the occupant are made possible, such as the body size of the occupant or the position and orientation of the occupant in the vehicle, or also with regard to other objects or occupants in the vehicle.

In one advantageous embodiment, the method is characterized in that the second piece of information describes data concerning a body part of the occupant.

This is understood to mean that the second piece of information is a direct piece of information concerning a body part of an occupant. A direct piece of information is understood to mean a recording or measurement or depiction, for example. A body part is understood to mean at least one body part; for example, the entire body may also be taken into account. A body part is understood to mean in particular the upper body, the head, or the face. The second piece of information also contains, for example a position, a location, a rotation, or an orientation of the occupant in relation to the vehicle or in relation to the vehicle seat.

This approach advantageously allows a high level of quality of the conclusions in the evaluation of the data, since the data directly depict the body of the occupant.

In one possible embodiment, the method includes that the second piece of information is ascertained with the aid of a camera sensor and/or an ultrasonic sensor and/or a laser sensor and/or a radar sensor.

This is understood to mean that the ascertained direct information is ascertained based on a direct recording or direct depiction or direct measurement or some other direct ascertainment and evaluation of at least one body part of the occupant.

A high level of information quality is advantageously made possible with the aid of the mentioned means. In some cases, little or no additional effort is necessary for this purpose, since an interior camera, for example, will be a standard installation in future vehicles. Therefore, there is little complexity involved with using these data for a classification of the occupant.

In one preferred refinement, the method includes that the first piece of information and the second piece of information are read into a control unit or a sensor and fused.

This is understood to mean that a control unit is provided which evaluates both pieces of information. The ascertained data are read in and processed in this shared control unit. This means that a joint evaluation of the data takes place. Alternatively, a sensor, for example an occupant recognition sensor with its own logic system, may be used for this purpose.

Mutual validation of the data is thus advantageously made possible.

In one alternative specific embodiment, the method includes the additional steps: ascertaining the first piece of information that indirectly describes the occupant; and/or ascertaining the second piece of information that directly describes the occupant; and/or adapting the safety device based on the provided classification.

This is understood to mean that additional steps may be provided that supplement the method. Ascertaining the first (indirect) piece of information and ascertaining the second (direct) piece of information are mentioned in particular.

In one possible embodiment, the method includes that the ascertainment of the first piece of information takes place chronologically prior to the ascertainment of the second piece of information.

This is understood to mean that the ascertainment of the first piece of information takes place earlier than the ascertainment of the second piece of information. Likewise, the reading in of the first piece of information into a control unit may take place earlier than the reading in of the second piece of information, for example into the same or a different control unit, or the corresponding sensor.

In this way, use is advantageously made, for example, of more rapid availability of the indirect information. As described above, a separate ascertainment of the indirect information is sometimes not necessary; i.e., it has already been carried out by other vehicle functions. Using the available information allows a time savings within the scope of this method when the information is evaluated immediately as soon as it is available or needed. The occupant recognition and classification in the vehicle are much easier due to the described method. For example, with the aid of the sitting position and/or orientation, persons may be more easily recognized by the radar, ultrasonic, laser, or camera sensors, since the size of the persons may already be estimated in advance. In addition, obstructed views and/or side views of persons may be more easily recognized or compensated for in the system when the sitting position and/or orientation of the persons on the seats are/is also already known prior to the recognition.

In one preferred refinement, the method is characterized in that the ascertained first piece of information is taken into account during the ascertainment of the second piece of information, or the ascertainment of the first piece of information and the ascertainment of the second piece of information take place independently of one another.

This is understood to mean that the ascertained indirect information is taken into account during the ascertainment of the direct information. This means that an evaluation of the indirect information takes place prior to the actual final classification of the occupant. An improvement in the ascertainment of the direct information may advantageously be achieved due to the knowledge of the indirect information. The immediate use of ascertained information during the ascertainment of further pieces of information allows the pending ascertainment to be carried out more quickly, as well as increased quality of the results, since the ascertainment of the pending information may be adapted to the information already ascertained.

Alternatively, the two pieces of information are ascertained independently of one another, i.e., separately. The two pieces of information are not taken into account until they are evaluated with regard to the classification of the occupant. For specific applications, this independent ascertainment of the two pieces of information, and combination only subsequently, also has a positive effect, for example due to the fact that the two pieces of information may be used for unilateral or mutual validation. Optimized quality of the results may be achieved in this way.

Moreover, a device is provided for classifying an occupant in a passenger compartment of a motor vehicle, using an interior sensor system, and for providing the occupant classification for a safety device in the motor vehicle. According to the present invention, the device is configured for carrying out at least one of the following steps:

reading in a first piece of information that indirectly describes the occupant;
reading in a second piece of information that directly describes the occupant;
classifying the occupant, taking the indirect and direct information into account;
providing the occupant classification to an interface to the safety device for the vehicle.

This is understood to mean that the device is designed and configured for carrying out the method as described above. The device may be designed, for example, as a control unit that carries out the above-described method. The control unit may include means for carrying out the method. In one alternative embodiment, the device is designed as a sensor system for ascertaining the first piece of information. In one alternative embodiment, the device is designed as a camera, ultrasonic, radar, or laser system for ascertaining the second piece of information. The mentioned interior sensor system may be designed for monitoring the passenger compartment. In addition, the interior sensor system may be designed to carry out the ascertainment of the second piece of information.

The device thus advantageously allows the implementation of the method described above. The resulting advantages are generally the same as already described for the method.

Furthermore, a computer program which is configured for carrying out the method described above is provided according to the present invention. Moreover, a machine-readable memory medium on which the computer program is stored is provided according to the present invention.

BRIEF DESCRIPTION OF THE DRAWINGS

It is to be noted that the features stated individually in the description may be combined with one another in any technically meaningful manner, and represent further embodiments of the present invention. Further features and advantages of the present invention result from the description of exemplary embodiments with reference to the figures.

DETAILED DESCRIPTION OF EXAMPLE EMBODIMENTS

Figure 1:
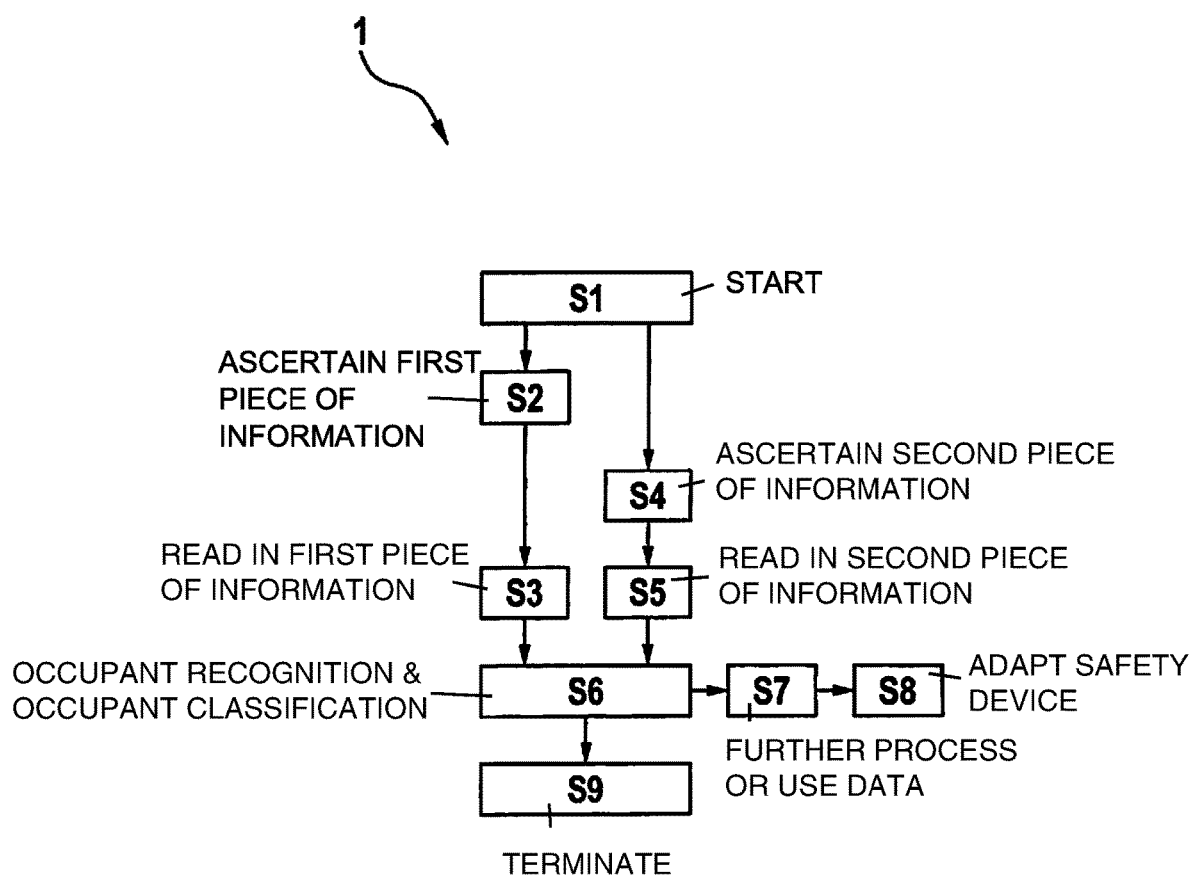
FIG. 1 shows a process diagram of the method according to a first possible embodiment.

FIG. 1 shows a process diagram of method 1 according to one possible embodiment. Method 1 begins in a first step S1. The start of the method may be coupled, for example, to the ignition of a vehicle, so that the method is automatically carried out every time the vehicle is started. However, it is also possible for step S1 to be repeated during travel if the system determines that the positions of the occupants have fundamentally changed, for example, the occupants have changed seats.

The ascertainment of the first piece of information takes place in a second step S2. The first piece of information indirectly describes the occupant. These indirect pieces of information are ascertained in particular by sensors on devices with which the occupant is in contact, for example the driver's seat. However, the steering wheel, side mirror, or rearview mirror may also be possible for this purpose. In particular the driver, but also any other person, may be analyzed as the occupant. For this purpose, for example a device may be analyzed which is adjusted to the occupant or which the occupant has adjusted to him/herself. Based on the ascertained settings, pieces of information concerning the driver are indirectly deduced. For example, it is ascertainable whether an occupant is even present at the location to be checked. In addition, for example precise locating of the occupant may be carried out, or the occupant's sitting position may also be ascertained (external information). Furthermore, information such as size or weight (internal information) concerning the occupant may be ascertained. These first pieces of information are read in in a further step S3 so that they may be evaluated in a continuation of the method, for example with the aid of a control unit.

The ascertainment of the second piece of information takes place in a further step S4. The second piece of information directly describes the occupant. These direct pieces of information are ascertained in particular by sensors which focus directly on the occupant. For example, an image sensor (camera) is possible which records the occupant. Of course, three-dimensional recordings are also possible. Ultrasonic sensors, laser sensors, and radar sensors are mentioned as alternatives. The occupant, or at least a body part of the occupant, is thus directly detected with the aid of the sensor. The direct pieces of information thus detected are read in in a step S5 so that they may be evaluated in a continuation of the method, for example with the aid of a control unit. The ascertainment of the second piece of information takes place independently of the ascertainment of the first piece of information. As illustrated in FIG. 1, the ascertainment of the second piece of information may, for example, take place subsequent to the ascertainment of the first piece of information, or the ascertainment of the two pieces of information may also take place in parallel or concurrently.

Occupant recognition and occupant classification take place in a next step S6, taking into account the read-in first and second pieces of information. In the exemplary embodiment in FIG. 1, the first and second pieces of information are combined for the first time and evaluated together. This is also referred to as data fusion. The evaluation takes place in a shared control unit, for example an airbag control unit. Of course, other pieces of information may also be taken into account. An occupant recognition and occupant classification are present as the result. These data are provided in a next step S7 for further processing or use, for example at an interface to a safety device. An airbag or some other restraint system, for example, may be regarded as a safety device. Automated driving functions also represent safety devices. In a step S8, the safety device in question is adapted to the data that are ascertained and provided from step S7. The method is terminated in a step S9, for example when the vehicle is switched off. Additionally or alternatively, it is possible to carry out steps S1 through S9 while the vehicle is still in a switched-off state.

Figure 2:
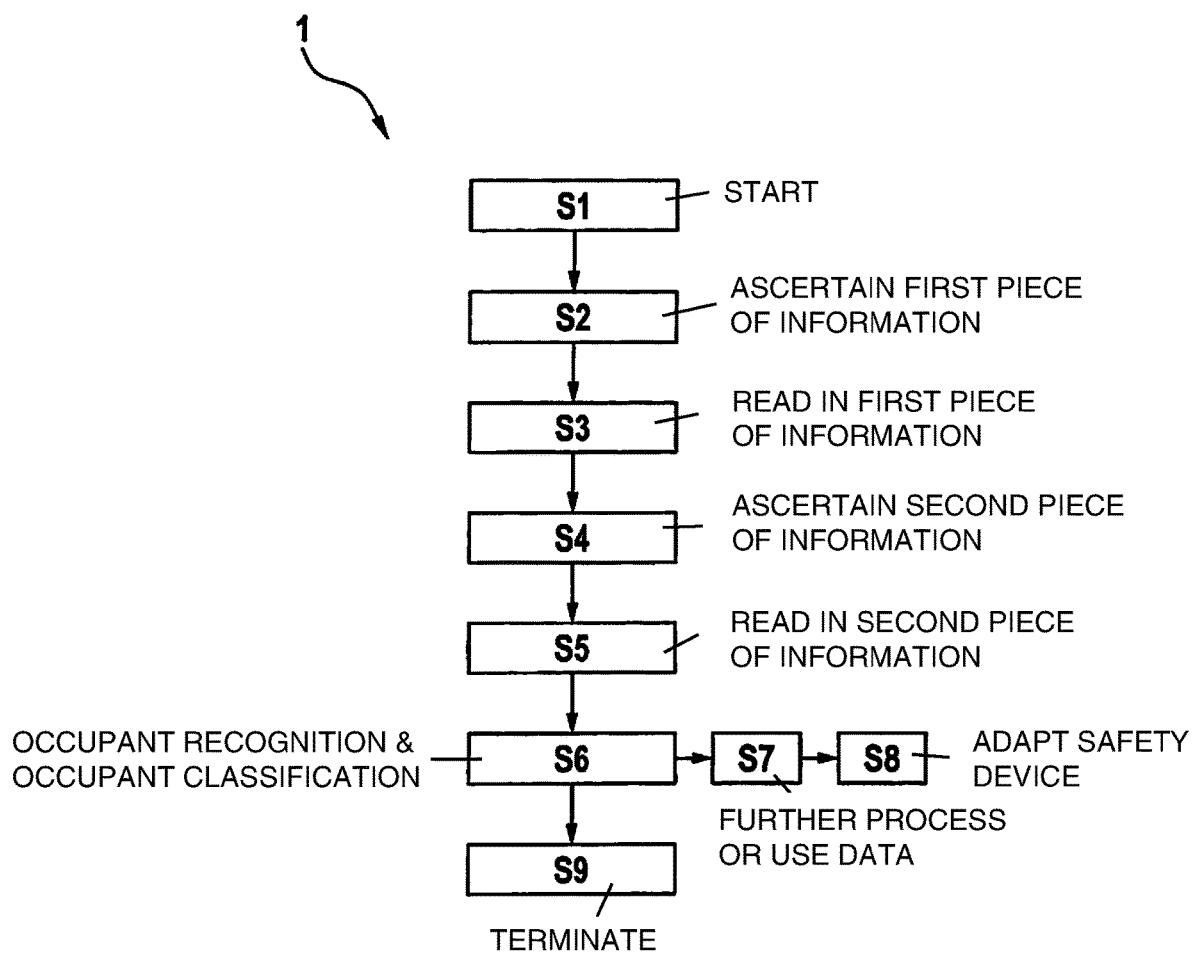
FIG. 2 shows a process diagram of the method according to a second possible embodiment.

FIG. 2 shows a process diagram of method 1 according to one alternative embodiment. In contrast to the embodiment in FIG. 1, step S4 (ascertaining the second piece of information) and step S5 (reading in the second piece of information) are carried out not in parallel, but, rather, subsequent to the ascertainment of the first piece of information. In this way, the first piece of information ascertained in S2 may already be taken into account during the ascertainment of the second piece of information in S4. For this purpose, for example the first piece of information in step S3 is read into the control unit for occupant recognition or the sensor for ascertaining the second piece of information. This information may thus already be taken into account during the ascertainment of the further pieces of information. For the further steps, reference is made to the above discussion.

What is claimed is:

1. A method for classifying an occupant and providing the occupant classification for a safety device in a motor vehicle, the method comprising:
reading in a first piece of information that indirectly describes the occupant;
reading in a second piece of information that directly describes the occupant;
classifying the occupant, taking the indirect and direct information into account;
providing the occupant classification to an interface to the safety device for the vehicle, wherein a rough classification of the occupant takes place based on the ascertained first piece of information, and wherein a fine classification of the occupant takes place based on the ascertained second piece of information;
ascertaining the first piece of information that indirectly describes the occupant;
ascertaining the second piece of information that directly describes the occupant; and
adapting the safety device based on the provided classification;
wherein the second piece of information describes data concerning a body part, which is an upper body or a head of the occupant,
wherein the first piece of information is information that is not directly collectable by measuring the occupant or evaluating direct pieces of information by recording the occupant, and
wherein the second piece of information includes pieces of information that are collected directly from the occupant, by recording and evaluating the recording of the occupant, or with the aid of direct measuring data of the body of the occupant.

2. The method as recited in claim 1, wherein the first piece of information includes data concerning at least one of: (i) a vehicle seat, (ii) a steering wheel, (iii) a side mirror, and/or (iv) a rearview mirror.

3. The method as recited in claim 1, wherein the first piece of information is ascertained with the aid of a sensor on at least one of: (i) a vehicle seat, (ii) a steering wheel, (iii) a side mirror, and/or (iv) a rearview mirror.

4. The method as recited in claim 1, wherein the first piece of information includes data concerning at least one of:
a setting of a vehicle seat;
a position of a vehicle seat;
a displacement of a vehicle seat;
an orientation of a vehicle seat;
a rotatory adjustment of a vehicle seat;
a setting of a steering wheel;
a setting of a side mirror;
a setting of a rearview mirror;
a position of a steering wheel;
a displacement of a steering wheel;
an orientation of a side mirror;
an orientation of a rearview mirror;
a rotatory adjustment of a side mirror; and/or
a rotatory adjustment of a rearview mirror.

5. The method as recited in claim 1, wherein the second piece of information describes data concerning the occupant and the body part of the occupant.

6. The method as recited in claim 1, wherein the second piece of information is ascertained with the aid of at least one of: (i) a camera sensor, (ii) an ultrasonic sensor, (iii) a laser sensor, and/or (iv) a radar sensor.

7. The method as recited in claim 1, wherein the first piece of information and the second piece of information are read into a control unit or a sensor, and are fused.

8. The method as recited in claim 1, wherein the ascertainment of the first piece of information takes place chronologically prior to the ascertainment of the second piece of information.

9. The method as recited in claim 1, wherein one of the following is satisfied:
the ascertained first piece of information is taken into account during the ascertainment of the second piece of information, or
the ascertainment of the first piece of information and the ascertainment of the second piece of information take place independently of one another.

10. A device for classifying an occupant in a passenger compartment of a motor vehicle, using an interior sensor system for monitoring the passenger compartment, comprising:
a processing device configured to perform the following:
reading in a first piece of information that indirectly describes the occupant;

reading in a second piece of information that directly describes the occupant;

classifying the occupant, taking the indirect and direct information into account;

providing the occupant classification to an interface to the safety device for the vehicle, wherein a rough classification of the occupant takes place based on the ascertained first piece of information, and wherein a fine classification of the occupant takes place based on the ascertained second piece of information;

ascertaining the first piece of information that indirectly describes the occupant;

ascertaining the second piece of information that directly describes the occupant; and adapting the safety device based on the provided classification;

wherein the second piece of information describes data concerning a body part which is an upper body or a head of the occupant, wherein the first piece of information is information that is not directly collectable by measuring the occupant or evaluating direct pieces of information by recording the occupant, and wherein the second piece of information includes pieces of information that are collected directly from the occupant, by recording and evaluating the recording of the occupant, or with the aid of direct measuring data of the body of the occupant.

11. A non-transitory machine-readable medium on which the is stored a computer program, which is executable by a processor, comprising:

a program code arrangement having program code for classifying an occupant and providing the occupant classification for a safety device in a motor vehicle, the computer program, by performing the following:

reading in a first piece of information that indirectly describes the occupant;

reading in a second piece of information that directly describes the occupant;

classifying the occupant, taking the indirect and direct information into account;

providing the occupant classification to an interface to the safety device for the vehicle, wherein a rough classification of the occupant takes place based on the ascertained first piece of information, and wherein a fine classification of the occupant takes place based on the ascertained second piece of information;

ascertaining the first piece of information that indirectly describes the occupant;

ascertaining the second piece of information that directly describes the occupant; and adapting the safety device based on the provided classification;

wherein the second piece of information describes data concerning a body part, which is an upper body or a head of the occupant, wherein the first piece of information is information that is not directly collectable by measuring the occupant or evaluating direct pieces of information by recording the occupant, and wherein the second piece of information includes pieces of information that are collected directly from the occupant, by recording and evaluating the recording of the occupant, or with the aid of direct measuring data of the body of the occupant.

* * * * *